US011976225B2

(12) United States Patent
Kolb et al.

(10) Patent No.: US 11,976,225 B2
(45) Date of Patent: May 7, 2024

(54) PROCESS FOR BONDING SUBSTRATES

(71) Applicant: Evonik Operations GmbH, Essen (DE)

(72) Inventors: Nicolai Kolb, Recklinghausen (DE); Gabriele Brenner, Dülmen (DE); Bernhard Schleimer, Marl (DE)

(73) Assignee: Evonik Operations GmbH, Essen (DE)

( * ) Notice: Subject to any disclaimer, the term of this patent is extended or adjusted under 35 U.S.C. 154(b) by 548 days.

(21) Appl. No.: 17/281,618

(22) PCT Filed: Oct. 11, 2019

(86) PCT No.: PCT/EP2019/077595
§ 371 (c)(1),
(2) Date: Mar. 31, 2021

(87) PCT Pub. No.: WO2020/074702
PCT Pub. Date: Apr. 16, 2020

(65) Prior Publication Data
US 2021/0388235 A1 Dec. 16, 2021

(30) Foreign Application Priority Data
Oct. 12, 2018 (EP) .................... 18200018

(51) Int. Cl.
C09J 5/00 (2006.01)
C08G 18/42 (2006.01)
C08G 18/76 (2006.01)
C09J 175/04 (2006.01)

(52) U.S. Cl.
CPC .............. C09J 5/00 (2013.01); C08G 18/42 (2013.01); C08G 18/7664 (2013.01); C09J 175/04 (2013.01); C09J 2475/00 (2013.01)

(58) Field of Classification Search
CPC ........ C09J 5/00; C09J 175/04; C09J 2475/00; C08G 18/42; C08G 18/7664
USPC ...................................... 156/327
See application file for complete search history.

(56) References Cited

U.S. PATENT DOCUMENTS

| 4,006,122 | A | 2/1977 | Chen et al. |
| 5,652,318 | A | 7/1997 | Braunstein et al. |
| 8,053,522 | B2 | 11/2011 | Loehden et al. |
| 8,163,843 | B2 | 4/2012 | Brenner et al. |
| 8,383,728 | B2 | 2/2013 | Brenner et al. |
| 8,702,899 | B2 | 4/2014 | Spyrou et al. |
| 8,901,231 | B2 | 12/2014 | Brand et al. |
| 9,840,581 | B2 | 12/2017 | Diehl et al. |
| 10,087,349 | B2 | 10/2018 | Brenner et al. |
| 10,202,488 | B2 | 2/2019 | Cron et al. |
| 10,246,617 | B2 | 4/2019 | Cron et al. |
| 10,385,240 | B2 | 8/2019 | Ramon-Gimenez et al. |
| 10,435,602 | B2 | 10/2019 | Cron et al. |
| 10,738,214 | B2 | 8/2020 | Kolb et al. |
| 10,961,418 | B2 | 3/2021 | Kolb et al. |
| 2007/0213465 | A1 | 9/2007 | Brand et al. |
| 2009/0283213 | A1 | 11/2009 | Moller et al. |
| 2010/0105831 | A1 | 4/2010 | Brenner et al. |
| 2011/0082252 | A1 | 4/2011 | Koschabek et al. |
| 2013/0338324 | A1 | 12/2013 | Beierlein et al. |
| 2017/0101565 | A1 | 4/2017 | Franken et al. |
| 2018/0282575 | A1* | 10/2018 | Breon .................. C08G 18/61 |
| 2018/0291153 | A1 | 10/2018 | Cron et al. |

(Continued)

FOREIGN PATENT DOCUMENTS

| EP | 2 492 292 A1 | 8/2012 |
| EP | 2 695 902 A1 | 2/2014 |
| WO | 2005/090428 A1 | 9/2005 |

(Continued)

OTHER PUBLICATIONS

Notice of Reasons for Refusal for JP 2021-517989, published Jan. 26, 2023 (2 pages).
German language International Search Report mailed on Nov. 7, 2019 in PCT/EP2019/077595 (4 pages).
International Search Report mailed on Nov. 7, 2019 in PCT/EP2019/077595 (2 pages).
Written Opinion mailed on Nov. 7, 2019 in PCT/EP2019/077595 (5 pages).

*Primary Examiner* — James D Sells
(74) *Attorney, Agent, or Firm* — Michael Best & Friedrich LLP

(57) ABSTRACT

The present invention relates to a process for bonding substrates, wherein the bond is a bond that can be released by heat treatment at a temperature of 50° C. to less than 200° C. and a composition is used to produce the bond, said composition containing a polymer of formula (I): Q-(O—C(O)—CR'R"—C(O)—R)$_x$, where: Q=a polymer group, selected from a polyester group and/or a polyolefin group, wherein the polymer group does not contain any components that result from the use of molecules having (meth) acrylic acid units as monomers; x is greater than or equal to 1; $R^1$=$R^2$ or O—$R^3$; R2=a hydrocarbon group, which can be substituted with halogen atoms, comprising 1 to 10 carbon atoms; R3=a hydrocarbon group, which can be substituted with halogen atoms, comprising 1 to 10 carbon atoms, or a polymer group; R'=—H, or a hydrocarbon group, which can be substituted with halogen atoms, comprising 1 to 10 carbon atoms, or a group of formula (II): —C(O)—NH-Q', where Q'=an organic group which can also have one or more silicon atoms; and R"=—H or a group of formula (II), with the proviso that if neither of the groups R' and R" is a group of formula (II), then at least one of the groups R' or R" is —H.

21 Claims, No Drawings

(56) References Cited

U.S. PATENT DOCUMENTS

2019/0382681 A1   12/2019  Maier et al.
2020/0216729 A1    7/2020  Kolb et al.

FOREIGN PATENT DOCUMENTS

| WO | 2010-510364 A1 | 4/2010 |
| --- | --- | --- |
| WO | 2016/000222 A1 | 1/2016 |
| WO | 2016/034394 A1 | 3/2016 |
| WO | 2016/139144 A1 | 9/2016 |
| WO | 2017/044726 A1 | 3/2017 |
| WO | 2020/126494 A1 | 6/2020 |
| WO | 2020/126496 A1 | 6/2020 |

* cited by examiner

PROCESS FOR BONDING SUBSTRATES

CROSS REFERENCE TO RELATED APPLICATIONS

This application is a 35 U.S.C. § 371 U.S. national phase entry of International Application No. PCT/EP2019/077595 having an international filing date of Oct. 11, 2019, which claims the benefit of European Application No. 18200018.2 filed Oct. 12, 2018, both of which are incorporated herein by reference in its entirety.

FIELD

The present invention relates to a method for bonding substrates, wherein the bonding is an adhesive bond which is separable by a heat treatment at a temperature of 50° C. to less than 200° C. and, for preparing the adhesive bond, a composition comprising a polymer of the formula (I), $$Q\text{-}(O\text{---}C(O)\text{---}CR'R''\text{---}C(O)\text{---}R^1)_x \quad (I)$$

with

Q=polymer radical selected from polyester and/or polyolefin radical, wherein the polymer radical contains no building blocks resulting from the use, as monomers, of molecules having (meth)acrylic acid units, x is greater than or equal to 1, $R^1=R^2$ or $O\text{---}R^3$, $R^2$=hydrocarbon radical which may be substituted with halogen atoms, having 1 to 10 carbon atoms, $R^3$=hydrocarbon radical which may be substituted with halogen atoms, having 1 to 10 carbon atoms, or polymer radical, R'=—H, hydrocarbon radical which may be substituted with halogen atoms, having 1 to 10 carbon atoms, or a radical of the formula (II), $$\text{---}C(O)\text{---}NH\text{-}Q' \quad (II)$$

with

Q'=organic radical which may also have one or more silicon atoms, R''=—H or a radical of the formula (II), with the proviso that, if neither of the radicals R' and R'' is a radical of the formula (II), at least one of the radicals R' or R'' is —H, is used.

BACKGROUND

Reactive polyurethane adhesives, both moisture-curing 1-component and also 2-component adhesives, are used in many industrial processes where particularly high demands are made on the adhesive bond. Especially in terms of thermal stability (heat resistance), crosslinked polyurethane adhesives exhibit outstanding properties.

However, it is a current legal requirement that joined components (bonded products) be recycled again at the end of the life cycle, or that the joined components be separable for the purpose of repairs without causing serious damage to the components, for example in electronic devices such as mobile telephones or displays. For such recycling or separation, the adhesive had to be separable "on demand" (De-Bonding on Demand, abbreviated to DBD).

A customary approach for De-Bonding on Demand is the introduction of temperature, as a result of which the adhesion and/or the cohesion are influenced. There are various approaches in this regard, for example the addition of a non-reactively incorporated resin into the adhesive formulation, which resin "softens" the adhesive at temperatures above the softening point and correspondingly lowers the cohesion (WO2016/000222). However, this approach is disadvantageous since the non-reactively incorporated polymers usually lead to a lower cohesion of the adhesive even at lower temperatures during the phase/period of use. They may impair the chemical resistance, be washed out or lead to undesired migration.

In Macromolecules, 2018, 51 (3), pages 660-669, the reaction product of an acetoacetoxyacrylic ester with a blocked isocyanate is described in order to obtain a thermolabile, radiation-crosslinkable crosslinker which makes radiation-curing adhesive separable on demand (by the action of heat). However, since in this case there are no longer any free isocyanate groups present, the use of this technology for reactive moisture-curing PU adhesives is not possible.

The fact that malonate-containing polyesters can also react with isocyanates to obtain polyesters with thermally labile bonds is described for example in U.S. Pat. No. 4,006,122. The use of such polymers in adhesives is however not mentioned here. Curing of the isocyanates using moisture is also not mentioned here, which is essential for reactive moisture-curing PU adhesives.

SUMMARY

It was accordingly an object of the present invention to provide reactive (polyurethane-based) hotmelt adhesives with a de-bonding on demand function.

DETAILED DESCRIPTION

Surprisingly, it was found that the use of a composition comprising a polymer of the formula (I), $$Q\text{-}(O\text{---}C(O)\text{---}CR'R''\text{---}C(O)\text{---}R^1)_x \quad (I)$$

with

Q=polymer radical selected from polyester and/or polyolefin radical, wherein the polymer radical contains no building blocks resulting from the use, as monomers, of molecules having (meth)acrylic acid units, x is greater than or equal to 1, $R^1=R^2$ or $O\text{---}R^3$, $R^2$=hydrocarbon radical which may be substituted with halogen atoms, having 1 to 10 carbon atoms, $R^3$=hydrocarbon radical which may be substituted with halogen atoms, having 1 to 10 carbon atoms, or polymer radical, R'=—H, hydrocarbon radical which may be substituted with halogen atoms, having 1 to 10 carbon atoms, or a radical of the formula (II), $$\text{---}C(O)\text{---}NH\text{-}Q' \quad (II)$$

with

Q'=organic radical which may also have one or more silicon atoms, R''=—H or a radical of the formula (II), with the proviso that, if neither of the radicals R' and R'' is a radical of the formula (II), at least one of the radicals R' or R'' is —H, solves this problem.

Therefore, a subject of the present invention is a method as defined in the claims and also in the following description.

The compositions used according to the invention have the advantage that adhesive formulations produced therefrom lead to adhesive bonds which are separable under the action of heat, especially of temperatures of less than 200° C.

Furthermore, the compositions used according to the invention have the advantage that the thermally labile bonding sites in the polymer network are reactively incorporated and hence do not give rise to any loss of the mechanical properties (e.g. cohesion) in the cured adhesive in the phase of use, as would be the case in the addition of non-reactive additives.

The inventive method is described by way of example hereinafter without any intention that the invention be restricted to these illustrative embodiments. Where ranges, general formulae or classes of compounds are specified hereinbelow, these are intended to encompass not only the corresponding ranges or groups of compounds which are explicitly mentioned but also all subranges and subgroups of compounds which can be obtained by removing individual values (ranges) or compounds. Where documents are cited in the context of the present description, their content shall fully form part of the disclosure content of the present invention, particularly in respect of the matters referred to. Where figures are given in percent hereinbelow, these are percentages by weight unless otherwise stated. Where averages, for example molar mass averages, are reported hereinbelow, these are the numerical average unless otherwise stated. Where properties of a material are referred to hereinbelow, for example viscosities or the like, these are properties of the material at 25° C. unless otherwise stated. When chemical (empirical) formulae are used in the present invention, the reported indices may be either absolute numbers or average values. The indices relating to polymeric compounds are preferably average values.

The inventive method for bonding substrates is characterized in that the bonding is an adhesive bond which is separable by a heat treatment at a temperature of 50° C. to less than 200° C. and, for preparing the adhesive bond, a composition comprising a polymer of the formula (I),

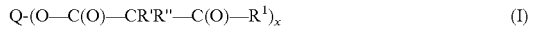

$$Q\text{-}(O\text{---}C(O)\text{---}CR'R''\text{---}C(O)\text{---}R^1)_x \quad (I)$$

with

Q=polymer radical selected from polyester and/or polyolefin radical, wherein the polymer radical contains no building blocks resulting from the use, as monomers, of molecules having (meth)acrylic acid units, x is greater than or equal to 1, preferentially 1 to 100, preferably 2 to 20, particularly preferably 3 to 10, $R^1=R^2$ or $O\text{---}R^3$, $R^2$=hydrocarbon radical which may be substituted with halogen atoms, having 1 to 10 carbon atoms, preferentially 1 to 7 carbon atoms and preferably 1 to 4 carbon atoms, $R^3$=hydrocarbon radical which may be substituted with halogen atoms, having 1 to 10 carbon atoms, preferentially 1 to 7 carbon atoms and preferably 1 to 4 carbon atoms, or polymer radical, preferentially selected from polyester or polyolefin radical, preferably a polymer radical which contains no building blocks resulting from the use, as monomers, of molecules having (meth)acrylic acid units, R'=—H, hydrocarbon radical which may be substituted with halogen atoms, having 1 to 10 carbon atoms, preferentially 1 to 7 carbon atoms and preferably 1 to 4 carbon atoms, or a radical of the formula (II),

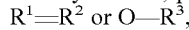

$$\text{---}C(O)\text{---}NH\text{-}Q' \quad (II)$$

with

Q'=organic radical which may also have one or more silicon atoms, preferably organic radical which has one or more —C(O)—NH building blocks, —N=C=O radicals or radicals of the formula (V), and preferably polyester and/or polyolefin radical which has one or more —C(O)—NH building blocks or —N=C=O radicals or radicals of the formula (V),

$$\mathcal{W}\; R^6Si\text{---}(OR^{6'})_x(R^{6''})_{y'} \quad (V)$$

with $R^6$ being a hydrocarbon radical which may also have nitrogen, sulfur and/or oxygen, preferably a hydrocarbon radical which has no nitrogen, sulfur or oxygen, $R^{6'}$ and $R^{6''}$ being identical or different saturated hydrocarbon radicals, preferably linear hydrocarbon radicals, preferentially having 1 to 18 carbon atoms, preferably having 1 to 3 carbon atoms, and x'=0 to 3, y'=0 to 3, with the proviso that x'+y'=3, and wherein the wavy line is a covalent bond to the nitrogen, wherein x'>=2 and y'<=1 is preferable and x'=3 and y'=0 is particularly preferable, R"=—H or a radical of the formula (II), with the proviso that, if neither of the radicals R' and R" is a radical of the formula (II), at least one of the radicals R' or R" is —H, is used.

In the polymer of the formula (I), Q is preferentially a polyester radical which is preferably based on diacids and/or polyacids and diols and/or polyols. Q is preferably a polyester radical which is based on diacids and diols.

Polymers of the formula (I) in which R' and R" are —H can be obtained by reacting OH— terminated polyesters or OH-terminated polyolefins with malonic acid, malonic acid monoester or malonic acid diesters, preferentially malonic acid dimethyl or malonic acid diethyl esters or with beta-keto esters of the formula (IV)

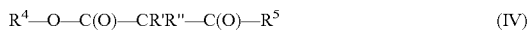

$$R^4\text{---}O\text{---}C(O)\text{---}CR'R''\text{---}C(O)\text{---}R^5 \quad (IV)$$

with R' and R"=—H and $R^4$ and $R^5$ being identical or different hydrocarbon radicals which may be substituted with halogen atoms, having 1 to 10 carbon atoms, preferentially having 1 to 7 carbon atoms and preferably having 1 to 4 carbon atoms. Particularly preferred compounds of the formula (IV) are methyl- or ethyl-2-acetoacetate.

Preferably, the OH-terminated polyesters or OH-terminated polyolefins are reacted with malonic acid, malonic acid monoester or malonic acid diesters, preferentially malonic acid dimethyl or malonic acid diethyl esters or with beta-keto esters of the formula (IV)

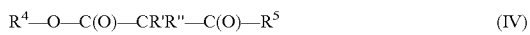

$$R^4\text{---}O\text{---}C(O)\text{---}CR'R''\text{---}C(O)\text{---}R^5 \quad (IV)$$

with R' and R"=—H and $R^4$ and $R^5$ being identical or different hydrocarbon radicals which may be substituted with halogen atoms, having 1 to 10 carbon atoms, preferentially having 1 to 7 carbon atoms and preferably having 1 to 4 carbon atoms, preferentially with catalysis, preferably with titanium or tin catalysts. The titanium-comprising catalyst used is preferably an organic titanium(IV) compound, for example titanium(IV) alkoxide, titanium(IV) carboxylate or titanium(IV) acetylacetonate. The titanium(IV) compound is preferably a titanium(IV) alkoxide, in which case it may be advantageous when the ligand is a bidentate diol. Examples of preferred titanium(IV) compounds are titanium tetramethoxide, titanium tetraethoxide, titanium tetrapropoxide, titanium tetraisopropoxide, titanium tetra-n-butoxide, titanium tetra-t-butoxide, titanium tetraphenoxide, titanium oxide acetylacetonate, titanium acetylacetonate and titanium dialkoxides based on diols.

As OH-functionalized, preferably OH-terminated polyesters or OH-functionalized, preferably OH-terminated polyolefins, use may be made of all known corresponding polymers.

As OH-functionalized, preferably OH-terminated polyesters, use is preferentially made of those having a functionality of at least 1, preferentially 1 to 100, preferably 2 to 20, and particularly preferably 3 to 10, which preferentially contain at least one diol or polyol and at least one di- or polycarboxylic acid. With regard to the polyols and polycarboxylic acids, there are no restrictions in principle, and it is possible in principle for any mixing ratios to occur. The selection is guided by the desired physical properties of the polyester. At room temperature, these may be solid and amorphous, liquid and amorphous or/and (semi)crystalline.

Polycarboxylic acids are understood to mean compounds bearing more than one carboxyl group and preferably two or more carboxyl groups. In the context of the present invention, carboxyl functionalities are also understood to mean derivatives thereof, for example esters or anhydrides.

The polycarboxylic acids may preferentially be aromatic or saturated or unsaturated aliphatic or saturated or unsaturated cycloaliphatic di- or polycarboxylic acids. Preference is given to using dicarboxylic acids. Examples of suitable aromatic di- or polycarboxylic acids and derivatives thereof are compounds such as dimethyl terephthalate, terephthalic acid, isophthalic acid, naphthalenedicarboxylic acid and phthalic anhydride. Examples of linear aliphatic dicarboxylic or polycarboxylic acids include oxalic acid, dimethyl oxalate, malonic acid, dimethyl malonate, succinic acid, dimethyl succinate, glutaric acid, dimethyl glutarate, 3,3-dimethylglutaric acid, adipic acid, dimethyl adipate, pimelic acid, suberic acid, azelaic acid, dimethyl azelate, sebacic acid, dimethyl sebacate, undecanedicarboxylic acid, decane-1,10-dicarboxylic acid, dodecane-1,12-dicarboxylic acid, brassylic acid, tetradecane-1,14-dicarboxylic acid, hexadecane-1,16-dioic acid, octadecane-1,18-dioic acid, dimer fatty acids and mixtures thereof. Examples of unsaturated linear di- and/or polycarboxylic acids include itaconic acid, fumaric acid, maleic acid or maleic anhydride. Examples of saturated cycloaliphatic di- and/or polycarboxylic acids include derivatives of cyclohexane-1,4-dicarboxylic acids, cyclohexane-1,3-dicarboxylic acids and cyclohexane-1,2-dicarboxylic acids.

It is possible in principle to use any desired polyols for the preparation of the polyesters. Polyols are understood to mean compounds bearing more than one hydroxyl group and preferably two or more hydroxyl groups. For instance, linear or branched aliphatic and/or cycloaliphatic and/or aromatic polyols may be present.

Examples of suitable diols or polyols are ethylene glycol, propane-1,2-diol, propane-1,3-diol, butane-1,4-diol, butane-1,3-diol, butane-1,2-diol, butane-2,3-diol, pentane-1,5-diol, hexane-1,6-diol, octane-1,8-diol, nonane-1,9-diol, dodecane-1,12-diol, neopentyl glycol, butylethylpropane-1,3-diol, methylpropane-1,3-diol, methylpentanediols, cyclohexanedimethanols, tricyclo[2.2.1]decanedimethanol, isomers of limonenedimethanol, isosorbitol, trimethylolpropane, glycerol, 1,2,6-hexanetriol, pentaerythritol, polyethylene glycol, polypropylene glycol and mixtures thereof.

Aromatic diols or polyols are understood to mean reaction products of aromatic polyhydroxyl compounds, for example hydroquinone, bisphenol A, bisphenol F, dihydroxynaphthalene etc., with epoxides, for example ethylene oxide or propylene oxide. Diols or polyols present may also be ether diols, i.e. oligomers or polymers based, for example, on ethylene glycol, propylene glycol or butane-1,4-diol.

Preference is given to using bifunctional diols and dicarboxylic acids.

Polyols or polycarboxylic acids having more than two functional groups may be used as well, such as trimellitic anhydride, trimethylolpropane, pentaerythritol or glycerol, for example. Moreover, lactones and hydroxycarboxylic acids may be used as constituents of the polyester.

Q is particularly preferably a polyester radical which is based on one or more, preferentially one, polyacid, selected from the group consisting of terephthalic acid, isophthalic acid, succinic acid, adipic acid, sebacic acid, 1,12-dodecanedicarboxylic acid and dimer fatty acids, and one or more, preferentially one, polyol, selected from the group consisting of ethylene glycol, propane-1,3-diol, butane-1,4-diol, pentane-1,5-diol, hexane-1,6-diol, neopentyl glycol, methylpropane-1,3-diol, trimethylolpropane, glycerol, pentaerythritol, polyethylene glycol and polypropylene glycol. Q is very particularly preferably a polyester radical which is based to an extent of at least 50 wt %, preferably 75 wt % and particularly preferably 95 wt %, relative to the polyester radical, on the stated polyacids and polyols, preferably adipic acid and hexanediol.

In the polymer of the formula (I), $R^3$ is preferentially a polyester radical which is preferably based on diacids and/or polyacids and diols and/or polyols, particularly preferably on diacids and diols. $R^3$ is preferably a polyester radical which is based on one or more, preferentially one, polyacid, selected from the group consisting of terephthalic acid, isophthalic acid, succinic acid, adipic acid, sebacic acid, 1,12-dodecanedicarboxylic acid and dimer fatty acids, and one or more, preferentially one, polyol, selected from the group consisting of ethylene glycol, propane-1,3-diol, butane-1,4-diol, pentane-1,5-diol, hexane-1,6-diol, neopentyl glycol, methylpropane-1,3-diol, trimethylolpropane, glycerol, pentaerythritol, polyethylene glycol and polypropylene glycol, very particularly preferably on adipic acid and hexanediol. $R^3$ is very particularly preferably a polyester radical which is based to an extent of at least 50 wt %, preferably 75 wt % and particularly preferably 95 wt %, relative to the polyester radical, on the stated polyacids and polyols, preferably on adipic acid and hexanediol.

If Q' is a polyester radical, then Q' is preferentially based on diacids and/or polyacids and diols and/or polyols, preferably on diacids and diols. Q' is particularly preferably a polyester radical which is based on one or more, preferentially one, polyacid, selected from the group consisting of terephthalic acid, isophthalic acid, succinic acid, adipic acid, sebacic acid, 1,12-dodecanedicarboxylic acid and dimer fatty acids, and one or more, preferentially one, polyol, selected from the group consisting of ethylene glycol, propane-1,3-diol, butane-1,4-diol, pentane-1,5-diol, hexane-1,6-diol, neopentyl glycol, methylpropane-1,3-diol, trimethylolpropane, glycerol, pentaerythritol, polyethylene glycol and polypropylene glycol, very particularly preferably on adipic acid and hexanediol. Q' is very particularly preferably a polyester radical which is based to an extent of at least 50 wt %, preferably 75 wt % and particularly preferably 95 wt %, relative to the polyester radical, on the stated polyacids and polyols, preferably on adipic acid and hexanediol.

The polyesters are preferably synthesized via a melt condensation. For this purpose, the aforementioned di- or polycarboxylic acids and diols or polyols are initially charged and melted in an equivalents ratio of hydroxyl to carboxyl groups of 0.5 to 1.5, preferably 1.0 to 1.3. The polycondensation takes place in the melt at temperatures between 150 and 280° C. over the course of 3 to 30 hours. In the course of this, a majority of the amount of water released is first distilled off at standard pressure. In the further course, the remaining water of reaction, and also volatile diols, are eliminated, until the target molecular weight is achieved. Optionally this may be made easier through reduced pressure, through an enlargement in the surface area, or by the passing of an inert gas stream through the reaction mixture. The reaction can additionally be accelerated by addition of an azeotrope former and/or of a catalyst, before or during the reaction. Examples of suitable azeotrope formers are toluene and xylenes. Typical catalysts are organotitanium or organotin compounds such as tetrabutyl titanate or dibutyltin oxide. Also conceivable are catalysts based on other metals, such as zinc or antimony, for example, and also metal-free esterification catalysts. Also possible are further additives and process aids such as antioxidants or color stabilizers.

The OH-terminated polyesters preferentially have an acid number, determined according to DIN EN ISO 2114, of between 0 and 10 mg KOH/g, preferably 0 to 3 mg KOH/g, more particularly 0 to 1 mg KOH/g. The acid number (AN) is understood to mean the amount of potassium hydroxide in mg needed to neutralize the acids present in one gram of solid. The sample for analysis is dissolved in dichloromethane and titrated with 0.1 N ethanolic potassium hydroxide solution using phenolphthalein.

The OH-terminated polyesters preferentially have an OH number, determined according to DIN 53240-2, of between 1 and 250 mg KOH/g, particularly preferably between 5 and 100 mg KOH/g.

As OH-functionalized polyolefin, preferentially OH-terminated polyolefin, preference is given to using an OH-functionalized polybutadiene, preferably an OH-terminated polybutadiene.

The number-average molecular weight, determined by gel permeation chromatography, of the hydroxyl-terminated polybutadienes is preferentially from 500 to 10,000 g/mol, more preferably from 1000 to 5000 g/mol and especially preferably from 1500 to 4000 g/mol. The OH— terminated polybutadiene may be in partly or fully hydrogenated form. Use is preferentially made of unhydrogenated OH-functionalized polybutadiene, preferably OH-terminated polybutadiene.

The hydroxyl-functionalized, preferably hydroxyl-terminated polybutadienes used in accordance with the invention are preferably prepared by means of free-radical polymerization, for example by polymerization of 1,3-butadiene in the presence of hydrogen peroxide, water and an organic solvent. Suitable processes are described, for example, in EP 2 492 292.

The polybutadienes usable with preference in the context of the present invention are commercially available, for example in the form of POLYVEST® HT from Evonik Resource Efficiency GmbH.

The functionality of the OH-functionalized, preferably OH-terminated, polyolefins, preferably polybutadienes, used, which may also be in partly or fully hydrogenated form, but are preferably unhydrogenated, is preferentially in the range from 1.8 to 5, preferably in the range from 2 to 3.5, and especially preferably in the range from 2 to 3.

It may be advantageous if, in the inventive composition, no polymer of the formula (I) is present in which neither of the radicals R' and R" in the polymer of the formula (I) corresponds to the formula (II) and if the composition additionally contains a compound of the formula (III)

O=C=N-Q'                                                    (III)

with Q' as defined above, preferentially Q' being a polyolefin and/or polyester radical. Such a composition may be a composition which can be used as precursor in an adhesive formulation.

It may be advantageous if, in the composition used according to the invention, at least one of the radicals R' and R", preferentially both radicals R' and R", in the polymer of the formula (I), correspond(s) to the formula (II) and if the composition additionally contains a compound of the formula (III)

O=C=N-Q'                                                    (III)

with Q' as defined above, preferentially with Q' being a polyolefin and/or polyester radical. Such a composition may be a composition which can be used directly as an adhesive formulation.

It may also be advantageous if, in the composition used according to the invention, at least one of the radicals R' and R", preferentially both radicals R' and R", in the polymer of the formula (I), correspond(s) to the formula (II) and if the composition does not contain a compound of the formula (III)

O=C=N-Q'                                                    (III)

with Q' as defined above, preferentially with Q' being a polyolefin and/or polyester radical. Such a composition may be a composition which can be used directly as an adhesive formulation or which is a cured adhesive formulation (bond).

Polymers of the formula (I) in which at least one of the radicals R' and R", preferentially both radicals R' and R", in the polymer of the formula (I), correspond(s) to the formula (II), may be obtained by reacting polymers of the formula (I) in which at least one or preferentially both of the radicals R' and R" are —H with a compound of the formula (III). Compounds of the formula (III) which may preferably be used may for example be obtained by reacting OH-terminated polyesters or OH-terminated polyolefins with a di- or polyisocyanate compound, preferably diisocyanate compound. The reaction of the OH-modified polymers with polyisocyanates may be carried out as described in the prior art, for example in WO2016139144, WO2016034394 or WO2005090428.

As OH-terminated polyesters or OH-terminated polyolefins, those described above are preferentially used.

Suitable isocyanate compounds are preferentially diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate or mixtures thereof, preferably diphenylmethane 4,4'-diisocyanate or a mixture of diphenylmethane 4,4'-diisocyanate and diphenylmethane 2,4'-diisocyanate.

Aside from the polymers of the formula (I) and optionally the compounds of the formula (III), the compositions may have further auxiliaries customary for adhesive formulations, for example non-OH-functionalized polymers, for example thermoplastic polyurethanes (TPUs) and/or polyacrylates and/or ethylene-vinyl acetate copolymers (EVA); pigments or fillers, for example talc, silicon dioxide, titanium dioxide, barium sulfate, calcium carbonate, carbon black or colored pigments; tackifiers, for example rosins, hydrocarbon resins, phenolic resins, and ageing stabilizers and auxiliaries. The fraction of auxiliaries in the composition used according to the invention may be up to 50 wt %, preferentially from 0.1 to 25 wt %.

It may be advantageous if the composition used according to the invention contains zinc, preferentially in the form of zinc ions or zinc compounds. The composition used according to the invention preferably contains Zn(acac)$_2$. The fraction of zinc in the inventive composition is preferentially from 0.0001 to 1 wt %, preferably from 0.001 to 0.5 wt % and particularly preferably from 0.01 to 0.1 wt %, based on the total composition. The presence of zinc atoms or ions makes it possible to influence the formation and/or the breaking of the bond between isocyanate group and the acid H atom of the malonic acid unit.

It may be advantageous if the composition used according to the invention contains titanium, preferentially in the form of titanium ions or titanium compounds. The titanium pres-

ent in the composition used according to the invention is preferentially in the form of organic titanium(IV) compounds, for example titanium(IV) alkoxide, titanium(IV) carboxylate or titanium(IV) acetylacetonate. The titanium (IV) compound is preferably a titanium(IV) alkoxide, in which case it may be advantageous when the ligand is a bidentate diol. Examples of preferred titanium(IV) compounds are titanium tetramethoxide, titanium tetraethoxide, titanium tetrapropoxide, titanium tetraisopropoxide, titanium tetra-n-butoxide, titanium tetra-t-butoxide, titanium tetraphenoxide, titanium oxide acetylacetonate, titanium acetylacetonate and titanium dialkoxides based on diols. Preferentially, the titanium is not in the form of a compound having a ligand containing amino groups. The composition used according to the invention particularly preferably contains titanium(IV) alkoxides, especially titanium(IV) butoxide. The fraction of titanium in the composition used according to the invention is preferentially from 0.0001 to 1 wt %, preferably from 0.001 to 0.5 wt % and particularly preferably from 0.01 to 0.1 wt %, based on the total composition.

The compositions used according to the invention may preferably be one-pack or two-pack, moisture-curable or radiation-curable or thermally crosslinking polyurethane adhesives.

The method for preparing a composition used according to the invention is characterized in that a polymer of the formula (Ia),

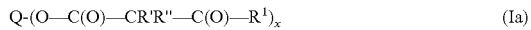

$$Q\text{-}(O\text{—}C(O)\text{—}CR'R''\text{—}C(O)\text{—}R^1)_x \quad (Ia)$$

with

Q=polymer radical selected from polyester and/or polyolefin radical, wherein the polymer radical contains no building blocks resulting from the use, as monomers, of molecules having (meth)acrylic acid units, x is greater than or equal to 1, preferentially 1 to 100, preferably 2 to 20, particularly preferably 3 to 10, $R^1=R^2$ or $O\text{—}R^3$, $R^2$=hydrocarbon radical which may be substituted with halogen atoms, having 1 to 10 carbon atoms, preferentially 1 to 7 carbon atoms and preferably 1 to 4 carbon atoms, $R^3$=hydrocarbon radical which may be substituted with halogen atoms, having 1 to 10 carbon atoms, preferentially 1 to 7 carbon atoms and preferably 1 to 4 carbon atoms, or polymer radical, preferentially selected from polyester or polyolefin radical, preferably a polymer radical which contains no building blocks resulting from the use, as monomers, of molecules having (meth)acrylic acid units, R'=—H, hydrocarbon radical which may be substituted with halogen atoms, having 1 to 10 carbon atoms, preferentially 1 to 7 carbon atoms and preferably 1 to 4 carbon atoms, or a radical of the formula (II),

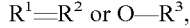

$$\text{—}C(O)\text{—}NH\text{-}Q' \quad (II)$$

with

Q'=organic radical which may also have one or more silicon atoms, preferably organic radical which has one or more —C(O)—NH building blocks, —N=C=O radicals or radicals of the formula (V), and preferably polyester and/or polyolefin radical which has one or more —C(O)—NH building blocks or —N=C=O radicals or radicals of the formula (V),

$$\mathord{\sim\!\!\sim} R^6Si\text{—}(OR^{6'})_x(R^{6''})_{y'} \quad (V)$$

with $R^6$ being a hydrocarbon radical which may also have nitrogen, sulfur and/or oxygen, preferably a hydrocarbon radical which has no nitrogen, sulfur or oxygen, $R^{6'}$ and $R^{6''}$ being identical or different saturated hydrocarbon radicals, preferably linear hydrocarbon radicals, preferentially having 1 to 18 carbon atoms, preferably having 1 to 3 carbon atoms, and x'=0 to 3, y'=0 to 3, with the proviso that x'+y'=3, and wherein the wavy line is a covalent bond to the nitrogen, wherein x'>=2 and y'<=1 is preferable and x'=3 and y'=0 is particularly preferable, R"=—H or a radical of the formula (II), with the proviso that at least one of the radicals R' and R"=—H, is mixed with a compound of the formula (III)

$$O=C=N\text{-}Q' \quad (III)$$

with Q' as defined above, preferentially Q' being a polyolefin and/or polyester radical.

If the compound of the formula (III) is one in which Q' is a radical of the formula (V), then this compound is preferentially selected from 3-isocyanatopropyltrimethoxysilane, 3-isocyanatopropyltriethoxysilane, 3-isocyanatopropyltriisopropoxysilane, 2-isocyanatoethyltrimethoxysilane, 2-isocyanatoethyltriethoxysilane, 2-isocyanatoethyltriisopropoxysilane, 4-isocyanatobutyltrimethoxysilane, 4-isocyanatobutyltriethoxysilane, 4-isocyanatobutyltriisopropoxysilane, isocyanatomethyltrimethoxysilane, isocyanatomethyltriethoxysilane or isocyanatomethytriisopropoxysilane.

If the compound of the formula (III) is one in which Q' is a radical of the formula (V), with $R^6$=nitrogen, sulfur and/or oxygen-comprising hydrocarbon radical, then this may for example be compounds which can be obtained by reacting di- or polyisocyanates with organofunctional silanes. Preferred organofunctional silanes are for example aminopropyltrimethoxysilane, aminopropyltriethoxysilane, N-methylaminopropyltrimethoxysilane, N-cyclohexylaminopropyltrimethoxysilane, N-phenylaminopropyltrimethoxysilane, mercaptopropyltrimethoxysilane or mercaptotriethoxysilane.

Preferentially, in each case amounts of the polymer of the formula (I) and the compound of the formula (III) are used such that the ratio of radicals R' and R" which are —H to radicals O=C=N— of the compound (III) is from 20 to 1 to 1 to 20, preferably from 5 to 1 to 1 to 5 and particularly preferably from 1 to 1 to 1 to 2.

It may be advantageous if zinc is added to the mixture as catalyst, preferentially in the form of zinc ions or zinc compounds, preferably in the form of an organic zinc compound, preferably $Zn(acac)_2$. Preferentially, an amount of zinc is added to the mixture such that the fraction of zinc in the mixture is preferentially from 0.0001 to 1 wt %, preferably from 0.001 to 0.5 wt % and particularly preferably from 0.01 to 0.1 wt %, based on the mixture. The presence of zinc atoms or ions makes it possible to influence the formation and/or the breaking of the bond between isocyanate group and the acid H atom of the malonic acid unit or of the beta-keto ester.

The mixing is preferably carried out at a temperature of greater than 70° C., preferably at a temperature of 85 to 160° C. The mixing is particularly preferably carried out in the inventive method in the melt.

It may be advantageous to carry out the mixing under a protective gas atmosphere, for example an inert gas or nitrogen atmosphere. This makes it possible to avoid unwanted reactions.

The mixing, preferentially under a protective gas atmosphere, is preferably carried out over a period of time of 0.1 to 180 minutes, preferably of 15 to 150 minutes.

The compositions used according to the invention may be used for bonding substrates. Preferentially, the bonding is an adhesive bond which (after curing) is separable by a heat treatment at a temperature of 100° C. to 190° C.

The compositions used according to the invention are particularly suitable for production of adhesive bonds of a variety of substrates, for example plastics, fiber-reinforced plastics, metals, types of wood, glass, glass-ceramic, concrete, mortar, brick, stone, foams, paper, cardboard, especially for bonding of metallic substrates, textiles, and various plastics.

The nature and extent of the bonding are unlimited. Preferably, the bonding is adhesive bonds in the wood and furniture industry (for example assembly bonding and the lamination of decorative films onto fiberboard), in the automotive and transport sector (for example laminations of films or textiles onto door side parts, inner roof linings, seat manufacture, retainer adhesive bonds, assembly adhesive bonds and also the manufacture of sandwich elements), in the electronics industry, construction industry (for example for the manufacture of panels and doors), in the shoe industry, in the graphical industry and in the textile industry, and in window construction (for example for profile ensheathing). In addition, the compositions used according to the invention are suitable in the packaging industry, as sealants and as coating material.

The compositions used according to the invention are suitable both for use in one-pack systems and in two-pack systems.

In the case of the one-pack adhesives, the mixture is produced at a time independent of the adhesive application, typically at a much earlier time. The application of the inventive adhesive is followed by curing, for example by moisture or by thermally induced reaction of the co-reactants present in the adhesive. In the case of the two-pack adhesives, the mixture is produced directly prior to adhesive application.

The adhesive formulations (compositions) used according to the invention can be applied by all known methods, for example extruder, bead, nozzle, spreading, dipping, injecting, pouring, rolling, spraying, printing, wiping, washing, tumbling, centrifuging, powder (electrostatic).

Even without further elaboration it is assumed that a person skilled in the art will be able to utilize the description above to the greatest possible extent. The preferred embodiments and examples are therefore to be interpreted merely as a descriptive disclosure which is by no means limiting in any way whatsoever.

The subject of the present invention is elucidated in detail in the examples which follow, without any intention that the subject of the present invention be restricted to these.

EXAMPLES

Measurement Methods:
1. Gel Permeation Chromatography

The number-average and weight-average molecular weight of the polymers used in the context of the present invention is determined to DIN 55672-1 by means of gel permeation chromatography in tetrahydrofuran as eluent and polystyrene for calibration. Polydispersity (U)=Mw/Mn.

2. OHN

The polymers prepared have hydroxyl groups as end groups. The concentration of the OH groups is determined in accordance with DIN 53240-2 by titrimetric means in mg KOH/g of polymer.

3. Viscosity

The viscosity of the polymers produced and of the reaction products of polymer and diisocyanate was determined in accordance with DIN EN ISO 3219 in Pa·s using a rotational viscometer at the temperature specified in each case.

4. NCO Number

The NCO number was determined in accordance with DIN EN 1242 by titrimetric means in % by weight.

5. Acid Number:

The concentration of acid end groups is determined in accordance with DIN EN ISO 2114 by titrimetric means in mg KOH/g of polymer.

Substances used:
DYNACOLL 7360: Hydroxyl-terminated crystalline polyester with OHN of 30, Tg=−60° C. and Tm=55° C., from Evonik Resource Efficiency GmbH, hereinafter abbreviated to P1

$Zn(acac)_2$: Zinc acetylacetonate hydrate (108503-47-5) from Merck

TYTAN™ TNBT: Titanium tetra-n-butoxide (5593-70-4) from Borica Co., Ltd

Diethylmalonate (TCI Deutschland GmbH)

DESMODUR® 44M: 4,4'-Diphenylmethane diisocyanate (from Covestro)

Example 1: Preparation of Malonate-Comprising Polyester (P2, not According to the Invention)

3991 g of polyester P1 are melted with 509 g of diethyl malonate and 2.25 g of TYTAN™ TNBT as catalyst in a 5 l glass flask with a distillation attachment under nitrogen. Subsequently, ethanol forming at a temperature of 160° C. within approximately five hours was distilled off at standard pressure. Subsequently, at the same temperature, the pressure was lowered in 100 mbar increments to <10 mbar, in order to distill off unreacted diethyl malonate.

A crystalline polyester having a melting point (DIN 53765) of 42° C. was obtained with an acid number <1 mg KOH/g, OHN of 3.0 mg KOH/g and a molecular weight of Mn=3.1 kDa.

NMR showed that primarily the end groups of the polyester P1 had been functionalized and only a small amount of chain extension by the diethyl malonate had taken place, and so the polyester P2 was characterized by the malonate functionality with a "hypothetical OHN" (which serves to calculate the initial weight of the NCO component in subsequent reactions) of 30.

Example 2: Preparation of NCO-Terminated Prepolymer (RHM1, not According to the Invention)

In a 500 ml flat-flange flask, 300 g of P1 were melted at 100° C. and dried under vacuum for 45 minutes. Thereafter, 37.5 g of 4,4'-diphenylmethane diisocyanate (DESMODUR® 44M—Covestro; OH:NCO 1:2.2) were added and swiftly homogenized. For complete conversion of the co-reactants, the mixture was stirred under a protective gas atmosphere at 100° C. for 45 minutes. Subsequently, the NCO-terminated prepolymer (RHM 1) was discharged.

Example 3: Preparation of RHM 2 (According to the Invention)

In a 500 ml flat-flange flask, 180 g of RHM1 were melted at 100° C. Thereafter, 0.03 g of $Zn(acac)_2$ and 20 g of P2 were added and swiftly homogenized. For complete conversion of the co-reactants, the mixture was stirred under a protective gas atmosphere at 100° C. for 60 minutes. Subsequently, the reactive adhesive (RHM 2) was discharged.

Example 4: Preparation of RHM 3 (According to the Invention)

In a 500 ml flat-flange flask, 160 g of RHM1 were melted at 100° C. Thereafter, 0.06 g of Zn(acac)$_2$ and 40 g of P2 were added and swiftly homogenized. For complete conversion of the co-reactants, the mixture was stirred under a protective gas atmosphere at 100° C. for 60 minutes. Subsequently, the reactive adhesive (RHM 3) was discharged.

Example 5: Preparation of RHM 4 (not According to the Invention)

In a 500 ml flat-flange flask, 160 g of RHM1 were melted at 100° C. Thereafter, 40 g of P1 were added and swiftly homogenized. For complete conversion of the co-reactants, the mixture was stirred under a protective gas atmosphere at 100° C. for 40 minutes. Subsequently, the reactive adhesive (RHM 4) was discharged.

Example 6: Preparation of RHM 5 (According to the Invention)

In a 500 ml flat-flange flask, 160 g of P1 and 40 g of P2 were melted at 100° C., 0.06 g of Zn(acac)$_2$ were added, and dried under vacuum for 45 minutes. Thereafter, 28.7 g of 4,4'-diphenylmethane diisocyanate (DESMODUR® 44M—Covestro; OH+ OH hyp/NCO 1:2.2) were added and swiftly homogenized. For complete conversion of the co-reactants, the mixture was stirred under a protective gas atmosphere at 100° C. for 45 minutes. Subsequently, the reactive adhesive (RHM 5) was discharged.

Example 7: Preparation of RHM 6 (According to the Invention)

In a 500 ml flat-flange flask, 300 g of P2 were melted at 100° C., 0.45 g of Zn(acac)$_2$ was added, and dried under vacuum for 45 minutes. Thereafter, 44 g of 4,4'-diphenylmethane diisocyanate (DESMODUR® 44M—Covestro; OH hyp/NCO 1:2.2) were added and swiftly homogenized. For complete conversion of the co-reactants, the mixture was stirred under a protective gas atmosphere at 100° C. for 180 minutes. Subsequently, the reactive adhesive (RHM 6) was discharged.

All the RHMs were evaluated in terms of mechanical properties and heat resistance. For the determination of the mechanical properties using tensile strength according to DIN 53504, films with a layer thickness of approximately 0.5 mm were drawn from the RHM and stored for 2 weeks (W) at 20° C. and 65% relative humidity. For the determination of the heat resistance, two beechwood substrates with a length of 100 mm, a width of 20 mm and a thickness of 5 mm were bonded overlapping in the form of a "T". The bonded surface area was 400 mm$^2$, the adhesive thickness was approximately 0.2 mm. The bonded test specimens were stored in a controlled-atmosphere cupboard under the same conditions. Subsequently, the bonded test specimen was placed in a rack, a weight of 400 g was hung from the long portion of the bonded test specimen, and the assembly was heated under defined conditions in a heating cabinet until the adhesive bond failed. In a pre-test, the measurement is started at a temperature of 50° C. and then raised incrementally after 20 minutes in each case by 10° C. until the adhesive bond separates and the weight falls to the floor. In the main test, the measurement is started 20° C. beneath the highest temperature from the pre-test at which the adhesive bond still held. The temperature is raised incrementally after in each case 20 minutes by 5° C. until the adhesive bond separates and the weight falls to the floor. The heat resistance is the highest temperature of the main test at which the adhesive bond still holds. The results of the tests are shown in Table 2.

TABLE 2

Results of the test of the reactive hotmelt adhesives (RHM) 1 to 6

| | RHM 1 | RHM 2 | RHM 3 | RHM 4 | RHM 5 | RHM 6 |
|---|---|---|---|---|---|---|
| NCO number (%) | 2.4 | 1.8 | 1.4 | 1.5 | 2.4 | 2.2 |
| Tensile strength at 23° C. (N/mm$^2$) | 21 | 18 | 15 | 12 | 15 | 9 |
| Heat resistance (° C.) | >200 | 175 | 150 | 180 | 175 | 90 |

It is clear to see that with an increasing fraction of malonate, the heat resistance of the cured PU adhesives is significantly reduced. The mechanical properties before thermal stress are however sufficiently high.

The invention claimed is:

1. A method for bonding substrates, wherein the bonding is an adhesive bond which is separable by a heat treatment at a temperature of 50° C. to less than 200° C. and, for preparing the adhesive bond, a composition comprising a polymer of the formula (I),

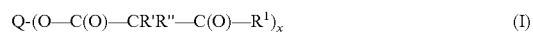

Q-(O—C(O)—CR'R''—C(O)—R$^1$)$_x$ (I)

with

Q=polymer radical selected from polyester and/or polyolefin radical, wherein the polymer radical contains no building blocks resulting from the use, as monomers, of molecules having (meth)acrylic acid units, x is greater than or equal to 1, R$^1$=R$^2$ or O—R$^3$, R$^2$=hydrocarbon radical, having 1 to 10 carbon atoms, R$^3$=hydrocarbon radical, having 1 to 10 carbon atoms, or polymer radical, R'=—H, hydrocarbon radical, having 1 to 10 carbon atoms, or a radical of the formula (II),

—C(O)—NH-Q' (II)

with

Q'=organic radical, and/or an organic radical which has one or more —C(O)—NH building blocks or —N=C=O radicals, R''=—H or a radical of the formula (II), with the proviso that, if neither of the radicals R' and R'' is a radical of the formula (II), at least one of the radicals R' or R'' is —H, is used.

2. The method according to claim 1, wherein neither of the radicals R' and R'' in the polymer of the formula (I) corresponds to the formula (II) and the composition contains a compound of the formula (III)

—C(O)—NH-Q' (II)

with Q' as defined above, Q' being a polyolefin and/or polyester radical.

3. The method according to claim 1, wherein Q is a polyester radical.

4. The method according to claim 1, wherein Q is a polyester radical which is based on one or more, selected from the group consisting of terephthalic acid, isophthalic acid, succinic acid, adipic acid, sebacic acid, 1,12-dodecanedicarboxylic acid and dimer fatty acids, and one or more, polyol, selected from the group consisting of ethylene glycol, propane-1,3-diol, butane-1,4-diol, pentane-1,5-diol, hexane-1,6-diol, neopentyl glycol, methylpropane-1,3-diol, trimethylolpropane, glycerol, pentaerythritol, polyethylene glycol and polypropylene glycol.

5. The method according to one of claim 1, wherein $R^3$ is a polyester radical which is based on diacids and/or poly acids and diols and/or polyols, polyacid, selected from the group consisting of terephthalic acid, isophthalic acid, succinic acid, adipic acid, sebacic acid, 1,12-dodecanedicarboxylic acid and dimer fatty acids, and one or more, polyol, selected from the group consisting of ethylene glycol, propane-1,3-diol, butane-1,4-diol, pentane-1,5-diol, hexane-1, 6-diol, neopentyl glycol, methylpropane-1,3-diol, trimethylolpropane, glycerol, pentaerythritol, polyethylene glycol and polypropylene glycol.

6. The method according to claim 1, wherein at least one of the radicals R' and R" in the polymer of the formula (I) corresponds to the formula (II) and the composition additionally contains a compound of the formula (III)

O=C=N-Q'      (III)

with Q' as defined above, with Q' being a polyolefin and/or polyester radical.

7. The method according to claim 1, wherein at least one of the radicals R' and R" in the polymer of the formula (I) corresponds to the formula (II) and the composition does not contain any compound of the formula (III)

O=C=N-Q'      (III)

with Q' as defined above, with Q' being a polyolefin and/or polyester radical.

8. The method according to claim 1, wherein, for preparing the composition, a polymer of the formula (Ia), Q-(O—C(O)—CR'R"—C(O)—R$^1$)$_x$      (Ia)

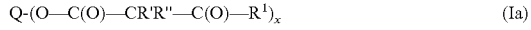

with

Q=polymer radical selected from polyester and/or poly olefin radical, wherein the polymer radical contains no building blocks resulting from the use, as monomers, of molecules having (meth)acrylic acid units, x is greater than or equal to 1, $R^1$=$R^2$ or O—$R^3$, $R^2$=hydrocarbon radical, having 1 to 10 carbon atoms, $R^3$=hydrocarbon radical, having 1 to 10 carbon atoms, or polymer radical, selected from polyester or polyolefin radical, R'=—H, hydrocarbon radical, having 1 to 10 carbon atoms, or a radical of the formula (II),

—C(O)—NH-Q'      (II)

with

Q'=organic radical, and/or organic radical which has one or more —C(O)—NH building blocks, —N=C=O radicals, and wherein at least one of the radicals R' and R"=—H, is mixed with a compound of the formula (III)

O=C=N-Q'      (III)

with Q' as defined above.

9. The method according to claim 8, wherein in each case amounts of the polymer of the formula (I) and the compound of the formula (III) are used such that the ratio of radicals R' and R" which are —H to radicals O=C=N— of the compound (III) is from 20 to 1 to 1 to 20.

10. The method according to claim 8, wherein an organic zinc compound, is added as catalyst.

11. The method according to one of claim 1, wherein the mixing is carried out at a temperature of greater than 70° C.

12. The method according to claim 8, wherein the mixing is carried out under a protective gas atmosphere, over a period of time of from 0.1 to 180 minutes.

13. The method according to claim 8, wherein the mixing is carried out in the melt.

14. The method according to claim 1, wherein the bonding is an adhesive bond which is separable by a heat treatment at a temperature of from 100 to 190° C.

15. The method according to claim 1, wherein Q is a polyester radical which is based on diacids and/or poly acids and diols and/or polyols.

16. The method according to claim 1, wherein Q is a polyester radical based on adipic acid and hexanediol.

17. The method according to claim 1, wherein $R^3$ is a polyester radical which is based on diacids and/or poly acids selected from the group consisting of terephthalic acid, isophthalic acid, succinic acid, adipic acid, sebacic acid, 1,12-dodecanedicarboxylic acid and dimer fatty acids, and one or more polyol selected from the group consisting of ethylene glycol, propane-1,3-diol, butane-1,4-diol, pentane-1,5-diol, hexane-1,6-diol, neopentyl glycol, methylpropane-1,3-diol, trimethylolpropane, glycerol, pentaerythritol, polyethylene glycol and polypropylene glycol.

18. The method according to claim 8, wherein $Z_n(acac)_2$ is added as catalyst.

19. The method according to claim 1, wherein the mixing is carried out at a temperature of greater than of from 85 to 160° C.

20. The method according to claim 8, wherein the mixing is carried out under a protective gas atmosphere over a period of time from 15 to 150 minutes.

21. The method according to claim 1, wherein:
$R^2$ is substituted with halogen atoms;
$R^3$ is substituted with halogen atoms;
$R^3$ is selected from polyester or polyolefin radical, as monomers, of molecules having (meth)acrylic acid units;
R' is substituted with halogen atoms;
Q' has one or more silicon atoms; and
Q' is a polyolefin or polyester radical.

* * * * *